United States Patent
Nordenstam et al.

(10) Patent No.: US 6,442,615 B1
(45) Date of Patent: Aug. 27, 2002

(54) SYSTEM FOR TRAFFIC DATA EVALUATION OF REAL NETWORK WITH DYNAMIC ROUTING UTILIZING VIRTUAL NETWORK MODELLING

(75) Inventors: Yngve Nordenstam, Tyresö ; Johan Tjäder, Uppsala, both of (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/547,762

(22) Filed: Apr. 12, 2000

Related U.S. Application Data

(63) Continuation of application No. PCT/EP98/06716, filed on Oct. 22, 1998.

(30) Foreign Application Priority Data

Oct. 23, 1997 (DE) .......................... 197 46 904
Oct. 22, 1998 (EP) ............................. 98 06716

(51) Int. Cl.[7] ........................................... G06F 15/173
(52) U.S. Cl. ...................... 709/241; 709/223; 709/224; 709/225; 709/226; 709/235; 709/241; 709/242
(58) Field of Search ................................ 709/223–226, 709/241–242, 235, 238; 395/500.23

(56) References Cited

U.S. PATENT DOCUMENTS

| | | | | |
|---|---|---|---|---|
| 4,979,118 A | * | 12/1990 | Kheradpir | 701/117 |
| 4,991,204 A | * | 2/1991 | Yamamoto et al. | 379/221 |
| 5,261,044 A | * | 11/1993 | Dev et al. | 345/357 |
| 5,598,532 A | * | 1/1997 | Liron | 395/500.23 |
| 5,608,721 A | * | 3/1997 | Natarajan et al. | 370/238 |
| 5,680,326 A | | 10/1997 | Russ et al. | |
| 5,706,436 A | * | 1/1998 | Lewis et al. | 709/235 |
| 5,838,769 A | * | 11/1998 | McNeil et al. | 379/14 |
| 5,854,903 A | * | 12/1998 | Morrison et al. | 709/249 |
| 6,067,572 A | * | 5/2000 | Jensen et al. | 709/241 |
| 6,085,238 A | * | 7/2000 | Yuasa et al. | 709/223 |
| 6,209,033 B1 | * | 3/2001 | Datta et al. | 709/224 |

FOREIGN PATENT DOCUMENTS

WO    92/05485    4/1992

OTHER PUBLICATIONS

Garg et al., "Wireless and Personal Communications System", (cover sheet only), Prentice Hall.
Acampora, "Wireless ATM: A Perspective on Issues and Prospects", IEEE Personal Communications, Aug. 1996, vol. 3, pp. 8–17.
Strehle et al, "MeBmodell zur Leistungsanalyse virtueller Trasnportverbindungen in realen Paketvermittlungsnetzen", Elektronische Rechennalagen, 27 Jahrgant, Heft, Jun. 1985, pp. 316–322.

* cited by examiner

Primary Examiner—Zarni Maung
Assistant Examiner—Nabil El-Hady
(74) Attorney, Agent, or Firm—Nixon & Vanderhye P.C.

(57) ABSTRACT

To provide an improved approach to traffic data evaluation in a network using dynamic routing there is provided a traffic data evaluation apparatus for a network using dynamic routing comprising traffic data collection means (12) to collect data with respect to a real traffic flow in the network. Further, the traffic data evaluation apparatus comprises a network modelling unit (14, 16) to model the network through a virtual network having virtual links without capacity restrictions imposed thereon. Still further, there is provided a network load evaluation means (18) to map the real traffic flow onto the virtual network assuming optimal routing and to compare the capacity used for each virtual link with the capacity assigned thereto. Thus, it is possible to draw conclusions on the network load by real network measurements also for a network using a dynamic routing protocol.

24 Claims, 14 Drawing Sheets

Fig. 7 a
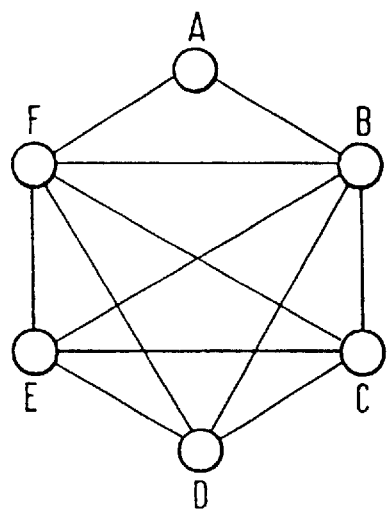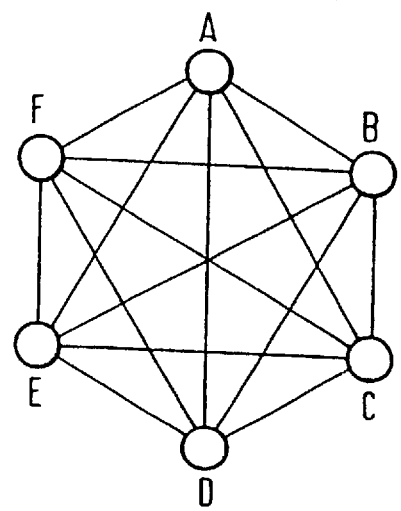
Fig. 7 b
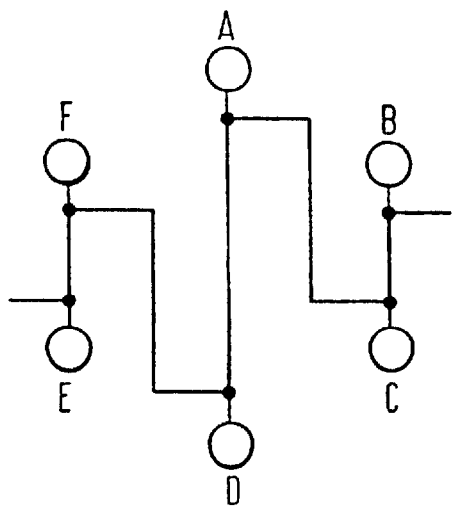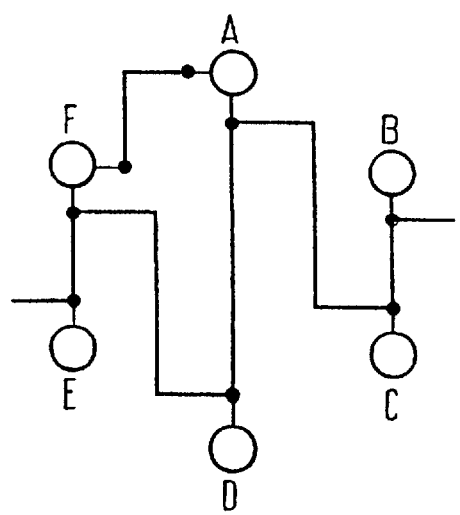

Fig. 7c
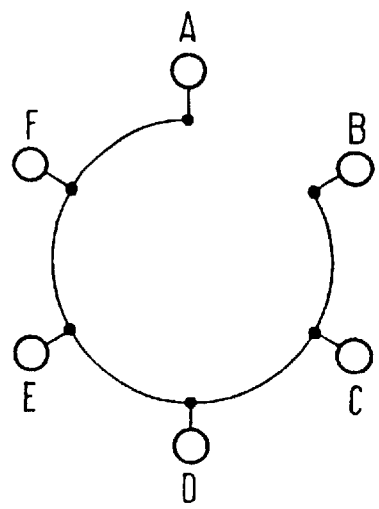 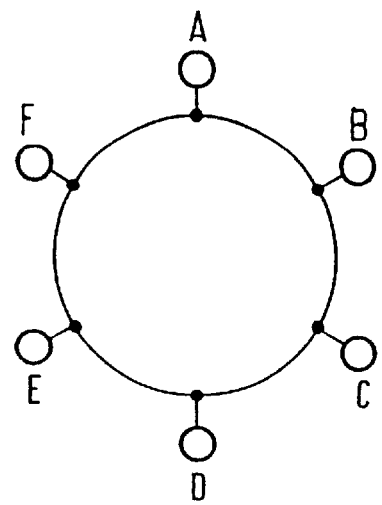
Fig. 7d
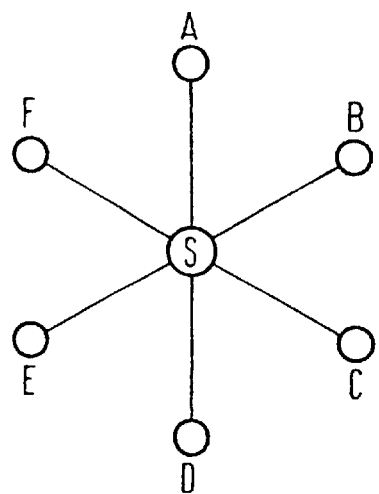 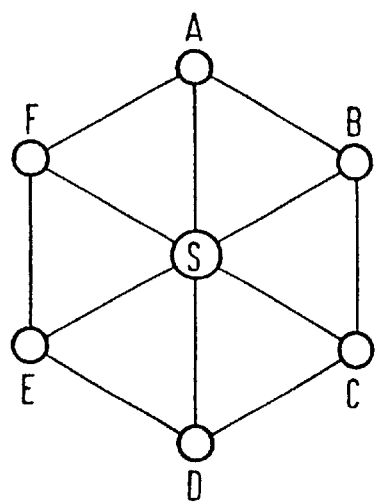

Fig. 7 e
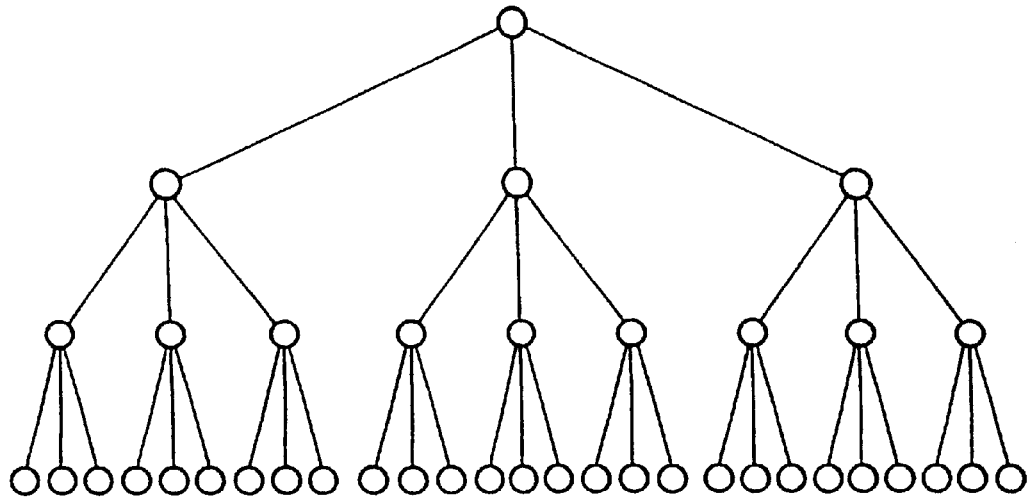
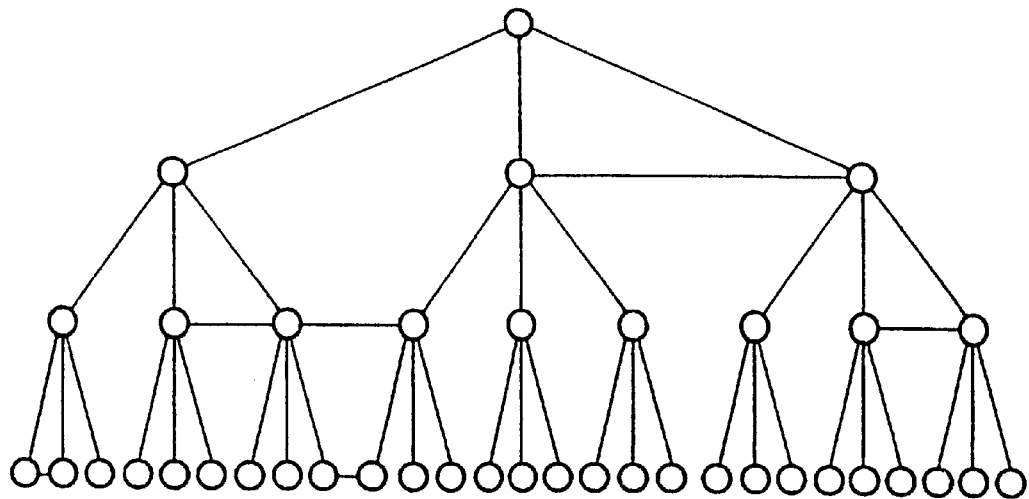

SYSTEM FOR TRAFFIC DATA EVALUATION OF REAL NETWORK WITH DYNAMIC ROUTING UTILIZING VIRTUAL NETWORK MODELLING

This is a continuation of PCT application No. PCT/EP98/06716, filed Oct. 22, 1998, the entire content of which is hereby incorporated by reference in this application.

FIELD OF THE INVENTION

The present invention relates to a traffic data evaluating apparatus, and in particular to a traffic data evaluating apparatus for a network using dynamic routing according to the preamble of claim 1.

Further, the present invention relates to a traffic data evaluation method.

BACKGROUND OF INVENTION

In U.S. Pat. No. 5,598,532 there is described a traffic data evaluation apparatus comprising a traffic data collection unit adapted to collect data with respect to a real traffic flow in a network which may then be used to achieve an improved network performance through a modified network resource arrangement.

Further, digital communication networks of the future will largely be based on networks using dynamic routing, e.g. networks using the asynchronous transfer mode ATM technology. Telecom operators today invest heavily on such new technology. Here, it is important that network operators have tools to insure that the own network works efficiently and further tools to predict where new investments in the form of extensions of the network should be realized.

FIG. 9 illustrates the principle of timesharing multiplexing where the complete message is split into packets. Thus, when two or more senders deliver packets to a router, the router can transmit both senders' information on the same physical circuit by re-sending one packet from the first, then one packet from the other, and so on. In normal circuit switched networks, only one of the senders could transfer information at one time. Now the circuits are instead only perceived at a higher level of abstraction, i.e. virtual circuits. The path of every connection's circuit may be determined using dynamic routing.

As shown in FIG. 10, the packets usually consist of a header, which contains all information necessary in order for the network to transmit the packet through the net, a body which consists of user data and a cyclic redundancy check code, CRC, which is used for bit transmit error detection.

In packet switched networks these packages may arrive at destination in disorder. The connection is here maintained at a higher level of abstraction with advanced buffering methods, so that the end user perceives a connection, where there is in fact none.

However, in circuit switched networks, as ATM, the route through the network is determined in advance, possibly using dynamic routing. Hence, all packets are guaranteed to arrive in correct order. Also, since the route in ATM networks is determined and relayed to the nodes in advance, the packets need not contain all the information usually found in packet headers, because the node already knows how to switch cells on a certain connection. The header size of the packets can therefore be reduced and hence, they are called cells. By the same reason, the routing algorithms can be much simplified, which reduces the amount of computational power needed to perform the switching. Because of the high transmission reliability in ATM-networks, cells do not have a CRC.

FIG. 11 shows an ATM network as typical example for a network using dynamic routing. Here, the principle components are the ATM adaptation layer AAL, statistical concentrators, ATM switches, transmission links, and control computers. The statistical concentrators and ATM switches contain smoothing buffers to temporarily store arriving data packets that cannot be immediately delivered because in the case of a concentrator, data packets generated by active users arrive in parallel, but are delivered to the output sequentially, or in case of a switch, several data packets may arrive in parallel for the same output, but are delivered to that output sequentially. Thus, as a function of time the number of data cells stored in and transmitted by any smoothing buffer will rise and fall in accordance with end user data packet generation patterns.

Further, the control devices limit the traffic intensity on the various links such that quality of service QoS guarantees are maintained. For this reason, prior to receiving service, a given user must request a connection to the intended receiver and then the admission controller checks on the route found through the network. If such a route can be found, virtual connection numbers are assigned and the routing tables in the intervening switches are provided with instructions for routing of each ATM data cell bearing the right virtual connection number within its cell header. The user is then free to communicate over this new established virtual connection.

In addition, as shown in FIG. 11, the AAL is responsible for converting a user's data packet message into a sequence of ATM data cells and for re-assembling ATM data cells into complete messages. Here, a message may be an individual data cell, e.g., data or image, or a continuous bit stream, e.g., voice or video.

In particular, it should be noted that some networks using dynamic routing like the ATM communication system are virtual connection oriented networks where resources are not assigned on an exclusive basis, but rather are statistically shared among multiple connections.

Overall, these networks rely on virtual paths to segregate the collection of virtual connections into independently manageable groups. This concept is vital for creation of a viable admission policy since it decomposes a large job into independent sets of much smaller tasks.

Also, networks using dynamic routing provide for a route choice in advance. Here, the resources for every connection are negotiated before the establishment of the connection itself. The result of this negotiation then determines the transfer capacity of the connection, i.e. bit rate or bandwidth demand and the quality of service.

Apparently, there is reserved an amount of transfer capacity, bandwidth, during the establishing of a connection. However, when using services with varying bit rate the efficiency may be raised by the statistical multiplexing approach where not the full amount of capacity needed to cope with every eventuality is allocated, but it is instead assumed that bandwidth may be "borrowed" from other connections.

Thus, in considering the aspect of resource allocation in a network using dynamic routing, different factors such as quality of service, usage parameter control, connection admission control, and statistical multiplexing, should be taken into account. The parameter quality of service considers the demands on the quality of a connection. Here, a connection in the network may be established such that cells are transferred within a certain time, i.e. restriction on cell delay, that the transfer does not vary too much, i.e. restriction on cell delay variation, and that cells are not lost within the network, i.e. restriction of cell loss. Further, usually within networks using dynamic routing there exist no limits on the amount of cells that a user may produce. Nevertheless, this amount of produced cells may be controlled through the specification of the usage parameter.

Still further, connection admission control relates to a function which in the first phase of connection establishment decides whether or not there exists sufficient resources to establish a new connection in the network. Connection admission control considers whether the connection may be established with the requested bandwidth and quality of service while simultaneously upholding the quality of service for already established connections.

As already outlined above, statistical multiplexing relates to a sharing of bandwidth between different connections in a network using dynamic routing so as to avoid to allocate bandwidth according to peak levels for the different connections.

Taking into account the above principles, in a network using dynamic routing, finally a route in the network is determined through which the cells may be transported before the establishment of the actual connection. Thus, as routes are only established on demand, no advanced time consuming routing is required in the network nodes and cells may be switched in a simple way.

As shown in FIG. 12, in a network using dynamic routing there may exist many alternative routes between two nodes. In the examples shown in FIG. 12, the possible routes between node 1 and node 5 are route A running over nodes 1, 2, 3, 5, route B, running over nodes 1, 2, 7, 3, 5, route C, running over nodes 1, 2, 3, 4, 5, and route D, running over nodes 1, 2, 7, 3, 4, 5.

As is apparent from this example, the problem for the operator of a network using dynamic routing is to determine the best route. However, independent from the way the route is established, it will finally be established according to the above-referenced criteria. While simple static routing protocols will always choose the same way for every attempt to establish a certain connection dynamic routing protocols take into account the actual traffic picture that is gathered through intercommunication of network elements. One such protocol being supported by the ATM forum is the PNNI Private Network to Network Interface. This protocol handles the detection of neighbors and links, the synchronization of topology information, the flooding of topology information, peer group leader elections, summarization of topology state information, and a construction of routing hierarchy, respectively.

In a network with many nodes, the work load needed if every node in the network would have to hold information about every other node in the network would be overwhelming. Thus, according to the PNNI routing protocol, this information is handled in a hierarchical fashion. Several nodes gathered together in peer groups and an election process determines a peer group leader which interacts with other peer group leaders. If necessary, these peer group leaders will cluster to form new higher peer groups which will again have a peer group leader, as outlined above.

Further, between the nodes in a peer group, topology information is exchanged so that every node in the peer group knows about the state of its own peer group. Also, the peer group leader communicates this information to higher levels of hierarchy where this information is gathered in the network elements. Thus, dynamic routing protocols allow to distribute load information to the network elements that are informed about the status of other elements. Based on this information, the best routes are then calculated and stored, e.g., in a designated transit list DTL.

Further, the dynamic routing protocol providing information on the load status in the network allows to choose the route which in the perspective of the network operator seems to be optimal not only based on the actual traffic load, but also according to predefined operated preferences.

FIGS. 13 and 14 show further details of traffic measurements. In particular, FIG. 13 is related to short term traffic variation and FIG. 14 is related to traffic variation during a day.

As is shown in FIG. 13, the number of connections via a link typically varies in a complex manner, as individual connections are established and removed. If this random variation is smoothed out by taking a running average, the number of calls in progress is found to vary during the day, e.g., according to the example shown in FIG. 14. Usually, there are very few connections during the night and the number of connections rises as people go to work and it reaches a maximum by the middle of the morning. Further, initially it falls at midday as people go to lunch and then rises again in the afternoon. Finally, it decreases as people go home from work and there exists a further peak in the evening as people make social calls. As shown in FIG. 14, a period of an hour, which corresponds to the peak connection load is called the busy hour and here is from 10 a.m. to 11 a.m. When dealing with ATM networks different traffic types may have different behaviour.

While in a network where a routing is of a static nature it is possible to make straight forward measurements on the traffic flow in the network, and thus to draw conclusions in terms of needed extensions/changes in a network to the contrary with a connection oriented dynamic routing protocol such as the PNNI protocol, it is hard to draw conclusions from measurements on the actual traffic flow in the network as it lies in the nature of a network using dynamic routing to try and overcome hidden bottlenecks and potential high load situations in the network by dynamically changing the routing situation.

Thus, in a network using dynamic routing it must be taken to account that the routing protocol is operating to adjust routing selections according to new connections to avoid highly loaded links. Further, while the above referenced PNNI-protocol will almost certainly be used in commercial networks using dynamic routing, only few or no studies exist on how this protocol behaves in stress traffic situations.

Another problem that occurs is that under certain circumstances a network using dynamic routing may oscillate in a way that peak loads swing to and from between different parts of the network. Such a situation will lead the overload signals to wrong places in the network.

Still further, the question arises whether the current dynamic routing protocols lead to the most efficient networks as they are only able to effect the load situation at connection establishment time and take only into account the load situation in that moment.

Due to the deficiencies outlined above, net dimensioning becomes a very difficult problem. The reason for this is that user needs vary with time and new services pop up, new subscribers are added, old subscribers move, new transmission technology is mixed with old infra structure. Only in case the operator of a network using dynamic routing has reliable data on the network load and thus a reasonable projection thereof into the future, he may build a network having the right size and being provided with a little pro-activeness according to future needs.

SUMMARY OF THE INVENTION

In view of the above, the object underlying the present invention is to provide an improved approach to traffic data evaluation in a network using dynamic routing.

According to a first aspect of the invention, this object is achieved through a traffic data evaluation apparatus for a network using dynamic routing, having the features of claim 1 and comprising traffic data collection means to collect data with respect to a real traffic flow in the network, network modelling means to model the network through a virtual network having virtual links without capacity restrictions imposed thereon, and network load evaluation means to map the actual traffic flow onto the virtual network assuming optimal routing and to compare the capacity used for each virtual link with the capacity assigned thereto.

Further, according to a second aspect of the present invention, this object is achieved through modelling the network with a virtual network having no capacity restrictions imposed on the virtual links thereof, superimposing real traffic on the virtual network assuming optimum routing, and comparing the used capacity with assigned capacity for each virtual link.

Thus, according to the invention, the use of a virtual model of the network where each of the virtual links comprised therein may correspond to one or more real links between a pair of nodes and can carry an infinite amount of virtual traffic, allows for a traffic flow evaluation that is not effected by the fact that dynamic routing is constantly changing the conditions. Through the use of a virtual network it is possible to draw conclusions on the network load by real network measurements.

Further, the inventive approach may be used in any routing condition or any connection oriented network where the routing is changing in an unpredictable fashion by dynamic routing or through advanced network management functions.

Another advantage of the invention is that while a certain capacity is assigned to virtual links, no capacity restriction is imposed thereon, so that the traffic flow evaluations are carried out using the optimum routing criteria, so that the resulting picture on the network load indicates a real picture of the network load where a load may be well over 100% of the capacity of the real link. Thus, it is possible to identify links which would have had a high load, but where a dynamic routing protocol would have compensated for the high load in the real world. This gives the operator of the network time to eliminate the bottleneck by extending the network before the service to the customers is affected. Also, the traffic data evaluation approach according to the invention allows to monitor the traffic flow in a relative simple way, and further to simplify the evaluation of the efficiency in the network, the control of availability, and the control of quality.

According to a preferred embodiment of the invention, the traffic data evaluation is based on a post-processing step of data collected with respect to the real traffic flow in the network using dynamic routing. Here, the advantage is that according to the invention processing is based on real traffic situations that reflect what really took place in the network, and that this allows for the ability to compare the actual line of events with a theoretical analysis. The Call Admission Control will only consider the requested bandwidth allocation, not the real use of bandwidth (since this is impossible to tell in advance). Therefore this invention also takes into account the allocated bandwidth when post-processing Call Detail Record data. In this particular case, an advantage of the invention is that one can easily identify potential bottlenecks due to a very high virtual load being consistant over time.

According to yet another preferred embodiment of the invention, the data with respect to the actual traffic in a network is collected via a simulation of the network. This allows to flexibly evaluate a planned network with an arbitrary number of nodes and links. Also, a load capacity may be freely allocated to each link.

By measuring the amount of bandwidth that is actually in use, it is possible to determine how well the statistical multiplexing works. Such measurements may give even better results when the regular measurement of quality of service parameters is standard.

According to yet another preferred embodiment of the invention, the result of the traffic flow evaluation is used to draw conclusions in terms of needed extensions and changes of the network, respectively. Thus, it is possible to plan further extension of a common network in the future, e.g., a broad band integrated services digital network of which the basic technology again is the asynchronous transfer mode outlined above. According to the invention, there is provided an improved basis for a decision of the insertion of new hardware into a network using dynamic routing such that the network operator may implement the network as efficiently as possible with lower costs and better performance. Also, changes may be suggested in terms of new bandwidth or links in the network, and thus, the resulting load situation in the virtual network may be estimated still with the same real traffic data as input and still assuming the same routing criteria. Thus, the traffic data evaluation approach according to the present invention allows to identify needs to build up new capacity according to future needs.

Still further, according to yet another preferred embodiment of the invention, the result of the inventive traffic data evaluation approach may be visualized for an operator by displaying the virtual network with digit on procential load compared to the real network capacity with respect to every link and direction. Further, this could be displayed together with related real time measurements for the corresponding moment. Also, according to the invention it is possible to continuously measure and monitor the load fluctuations of the virtual load as well as to measure individual traffic classes/types to monitor their individual contribution.

Still further, according to yet another preferred embodiment of the present invention, the post-processing of actual traffic flow data where unsuccessful connection are taken into account is also possible.

Finally, according to yet another preferred embodiment of the invention, another possibility is to monitor all actual traffic that is passing a certain link, i.e. possibly selected for its high virtual load, and then display all load in the network generated from this selected traffic.

BRIEF DESCRIPTION OF FIGURES

Preferred embodiments of the present invention will now be explained with reference to the attached drawings in which:

FIGS. 7a–7e show possible extensions of network using dynamic routings according to different network topologies;

DESCRIPTION OF PREFERRED EMBODIMENTS

Figure 1:
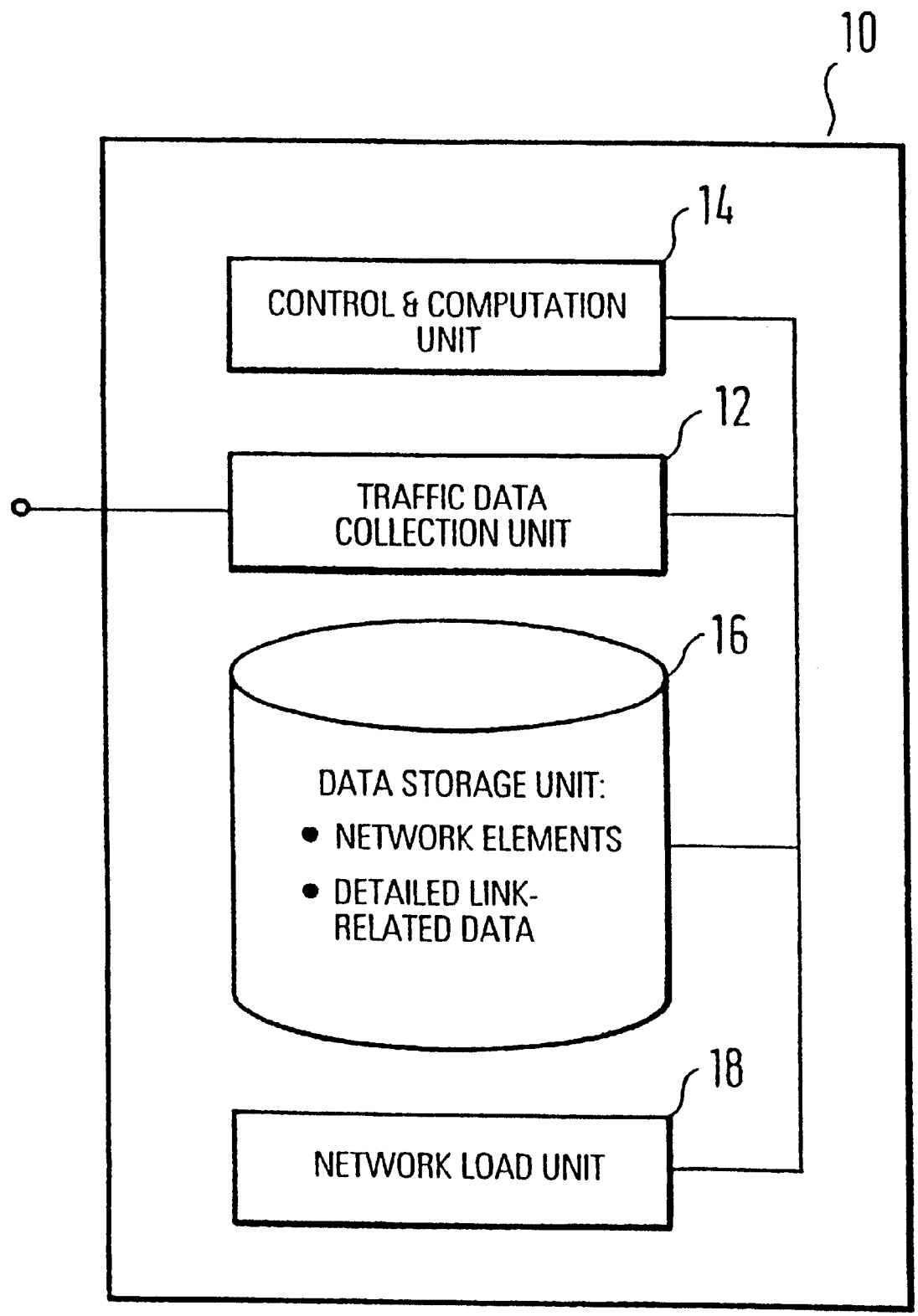
FIG. 1 shows a schematic diagram of a traffic data evaluation apparatus according to a first embodiment of the invention.

FIG. 1 shows a schematic diagram of a traffic data evaluation apparatus 10 according to a first embodiment of the present invention. This traffic data evaluation apparatus comprises a traffic data collection unit 12 that collects data with respect to an actual traffic flow in a network using a dynamic routing protocol. Further, the traffic data evaluation apparatus 10 comprises a control and computation unit 14 that is connected with both, the traffic data collection unit 12 and a data storage unit 16, wherein information on network elements and detailed link related data is stored. This control and computation unit 14 is also connected to a network load unit 18 wherein computation results according to the estimated network load on the virtual network are, firstly, visualized using a display, and secondly, the structure of the virtual network to model the network using a dynamic routing protocol may be modified.

In the traffic data evaluation apparatus shown in FIG. 1 the traffic data collection unit 12 allows to collect a plurality of data with respect to the actual traffic in the network using dynamic routing. The reason for this is that in the separate network elements there are a number of counters that are accessible through standardized interfaces, e.g., SNMP simple network management protocol in an ATM network. Here, an automatic tool that regularly fetches values may be constructed in case the functionality of the network element and the simple network management protocol is available.

One particular option to collect data with respect to the actual traffic in the network using a dynamic routing protocol is the measurement of quality of service QoS-parameters which are effected by the load and therefore are to be measured regularly. One such parameter is the cell transfer delay, CTD. However, the problem with the measurement of this parameter is that two clock signals are needed, i.e. one at the source and one at the destination, and that both must be exactly synchronized. Here, the synchronization is to be carried out in the nanosecond level to make the data useful. However, to get two clocks synchronized on this level, complicated measures are necessary which today require advanced equipment.

Another solution is to let the cells return to the source node and divide the cell transfer delay by two. Then it is possible to measure the cell transfer delay with only a single clock signal. However, the problem with this facilitated measurement is that the cell transfer delay CTD from A to B is not necessarily equal to the one from B to A, as it depends on the actual traffic load that differs from one direction to another.

Another option with respect to QoS parameters would be the measurement of cell delay variation and cell loss that are somewhat easier to measure. However, the cell delay variation CDV and the cell loss CL are not as clear as the cell transfer delay CTD when it comes to the evaluation of the network load and therefore are not as attractive as the cell transfer delay CTD for the traffic load measuring.

Further, a preferred way to implement the traffic data collection unit 12 shown in FIG. 1 is to use a call detail record, CDR, that is stored for every attempt to establish a connection. The call detail record CDR holds information about originating and terminating node, time and other aspects such as used and allocated bandwidth of a connection. As call detail records CDR are mainly used for billing, the network administration system gathers these call detail records CDR in a robust and stable way. Here, call detail records CDR are, e.g., stored in the network elements and then transmitted via a transfer protocol such as FTP to billing centers with large data bases. Thus, these data bases may provide exact information about the real traffic load in the network using a dynamic routing protocol. This exact information may be transferred to the data storage unit 16 in the traffic data evaluation apparatus 10 so that it is really accessible for further network load evaluation processes.

Using the information available from the data storage unit 16 the control and computation unit 14 may then carry out the allocation of virtual bandwidth in the virtual network used to model the real world network using a dynamic routing protocol. Here, the analysis carried out by the control and computation unit 14 in view of further extensions of the network can not only rely on measurement of the real traffic load, but there is also a need for a method that can see past the effects of the dynamic routing protocol. While usually performing simulations for such a network might be considered to analyze the actual traffic flow in the network, such an approach does not give any apparent clues as to where it is best to increase bandwidth. While the network operator may carry out intelligent guesses and then verify this through additional simulation runs, he actually is in need of a system that points out potential bottlenecks.

For this reason, the control and computation unit 14 according to the invention and shown in FIG. 1 carries out a post-processing of call detail records CDR stored in the data storage unit 16. While FIG. 1 shows only a single data storage unit 16, here it-should be noted that also a plurality of such data storage units may be provided for to cope with the large amount of data stored in the data storage unit 16.

Thus, according to the present invention the advantage is achieved in that the traffic data evaluation is carried out on real traffic situations. The data storage unit 16 reflects what really took place, and thus according to the invention it is possible to compare the actual line of events achieved through real measured traffic load data with an analysis based on call detail record information.

As already outlined above, it is important to note that the analysis only takes into account the bandwidth allocated, but not the bandwidth used. The reason for this is that the allocated bandwidth effects the connection admission control program that decides whether a new link may be established in the network or not.

Further, the present invention considers networks using a dynamic routing protocol such as the ATM network. Such routing protocols choose the routes in the network which are currently the best choice given the state of the network at that time, however, it is not certain that this is the best route in general terms. What is the best route is generally not unique, but for an optimal dynamic routing protocol the best route would be the route according to a completely unloaded network.

Figure 5:
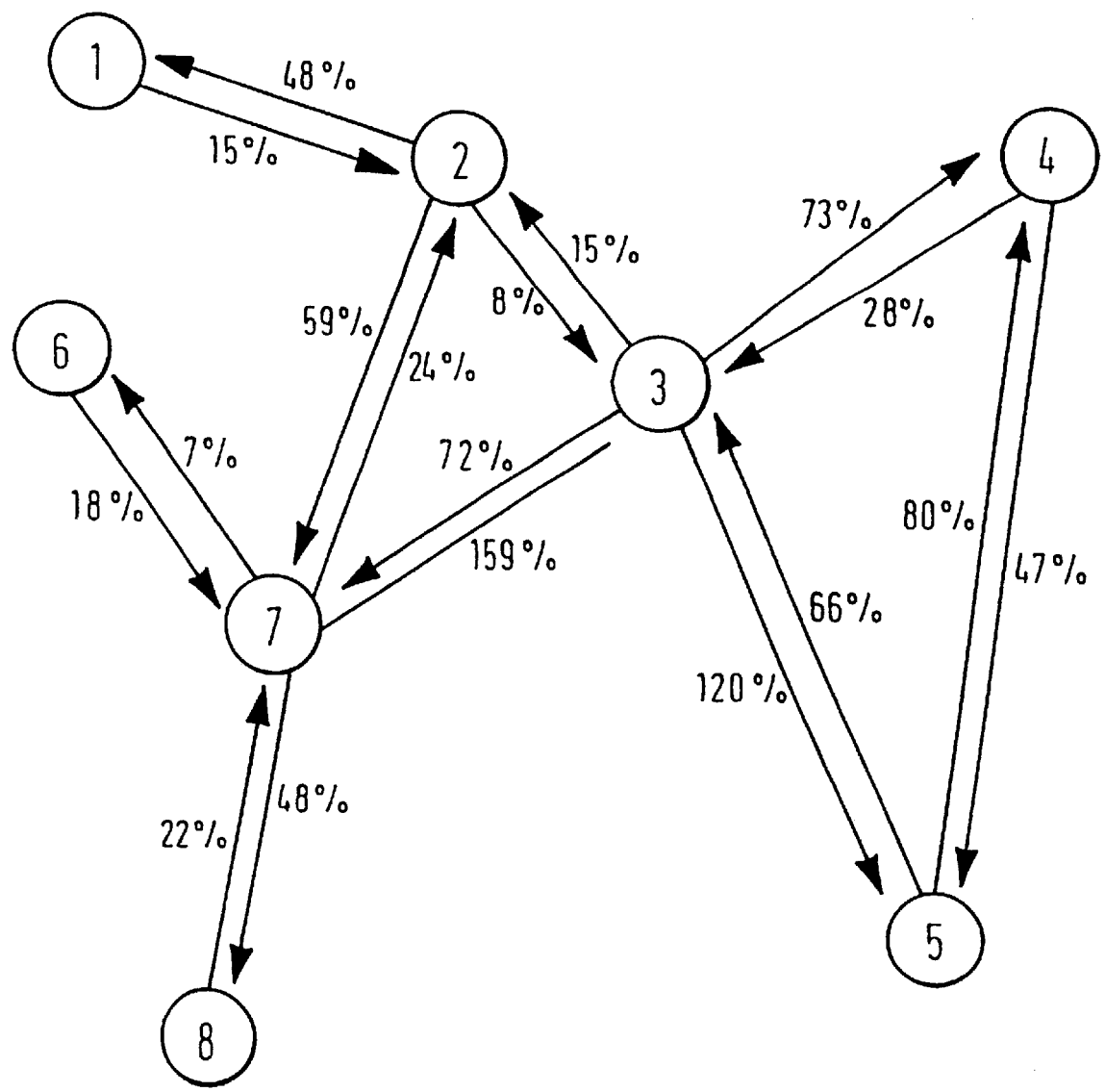
FIG. 5 shows a result of the traffic data evaluation approach according to the present invention with respect to each link in a virtual network for every direction.

Therefore, in the control and computation unit 14 shown in FIG. 1 a calculation is carried out with respect to a virtual network modelling the real network such that all connections are routed along the best route possible without concern for the load situation at establishment time. A typical result of this approach is shown in FIG. 5. While most links in the virtual network do not exceed the available capacity, an overload phenomena may be observed from node 3 to 5 according to 120% and from node 7 to node 3 according to 159%.

The particular algorithm executed by the control and computation unit 14 relies on the data storage unit 16 and the detailed related data according to extracted call detail records CDR for connections established in the real network. From the call detail record CDR the control and computation unit 14 extracts information about the source node, the destination node and the bandwidth. The best route is calculated and then the connection bandwidth demand is added on the links it passes. The result is a table with accumulated bandwidth demands that may then be presented as a map, as shown in the following.

This approach may be used to unveil potential bottlenecks in the network by identifying links with a very high load consistant over a longer time period. Also, it is noted that permanent and semi-permanent connections sometimes allocate large parts of the total capacity and that these connections also have call detail records CDR. However, as these connections stay up for a very long time it becomes pointless to consider them as outlined above. Thus, according to the invention the best route is calculated given the set of permanent and semi-permanent connections at the moment as prerequisites.

The difficulty associated with this analysis is that there may be two or more equivalent best routes. Here, according to the invention, all load is allocated on only one of these best routes that then gains too much virtual load. To compensate for this, according to the invention, there exist several alternatives that may be carried out by the control and computation unit 14:

1. Distribute the connections evenly on the alternatives. This is a simple and intuitive approach, however, not as trivial as it sounds. Firstly, there is no self-evident way to split the connections between these alternatives and, secondly, it is not self-evident that an even distribution gives the optimal analysis result.
2. Distribute the connections randomly: This is another simple and intuitive alternative.
3. Finally, according to the invention the optimal routing analysis is found by trying different distribution solutions in a search.

While in the above it was assumed that all connections are routed along the best route possible, a further option to consider multiple routes is to focus on the originating node, the terminating node, the connection and allocated bandwidth of a connection, respectively. Thus the traffic is superimposed on a "virtual" network model where links corresponding to one or more real links according to FIG. 5 between a pair of nodes can carry an infinite amount of virtual traffic, assuming the optimum routing criteria. This approach is even more effective in deriving an overload in the real network and, in particular, to compensate the dynamic changing of the routing according to the dynamic routing protocol.

Here, it should be noted that according to the second approach for the evaluation of the network load there may be established direct links between nodes that have no counterpart in the real network. Nevertheless, if this is the case, this would be a clear indication for possible changes and extensions of the existing networks.

The last component of the traffic data evaluation apparatus shown in FIG. 1 is a network load unit 18. This network load unit 18 is provided to display the result of the network load analysis and to provide options for a network modification to the network operator.

Figure 3:
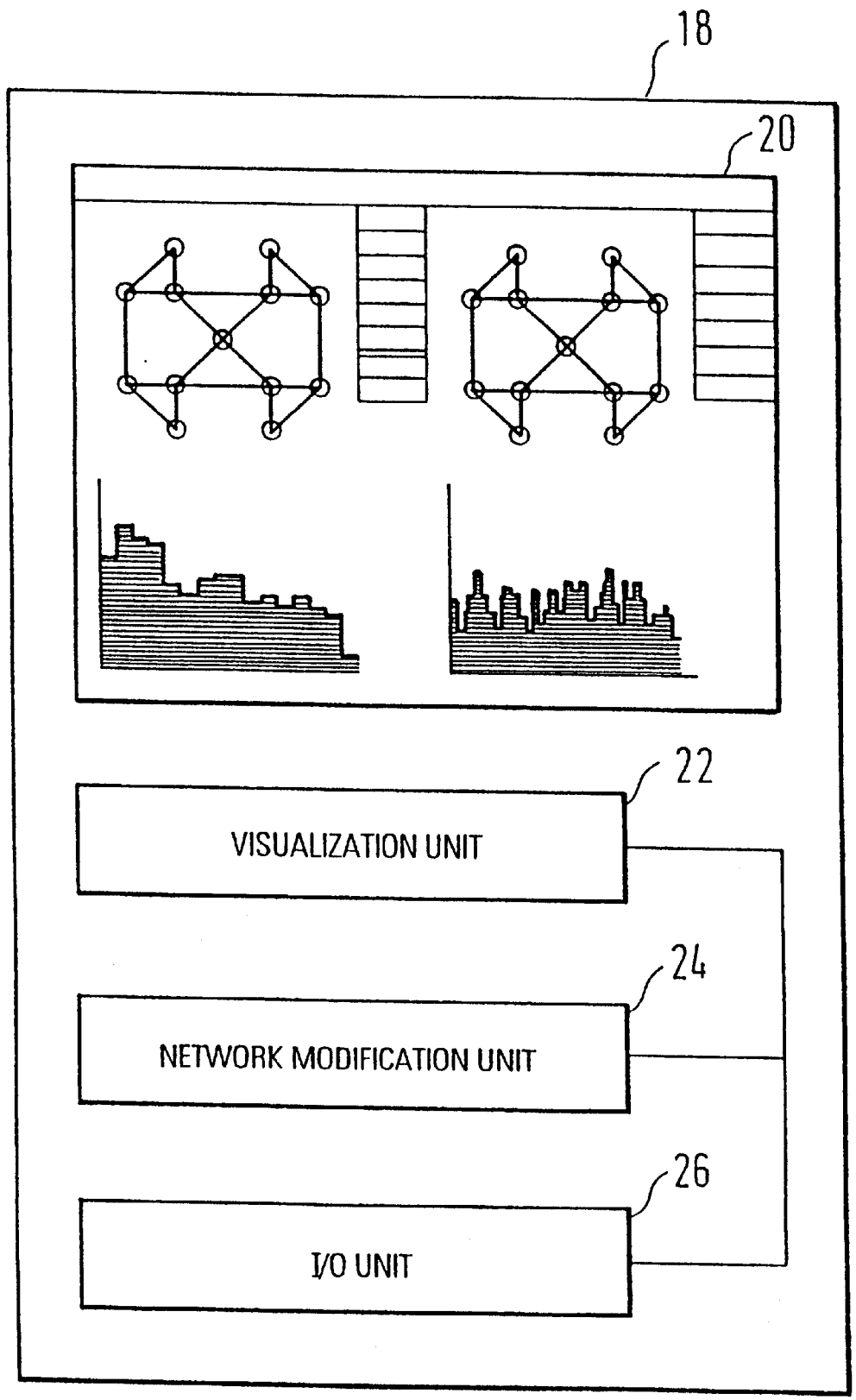
FIG. 3 shows a schematic diagram of the network load evaluation unit shown in FIGS. 1 and 2, respectively.

A more detailed schematic diagram of the network load unit 18 is shown in FIG. 3. In particular, the network load unit comprises a display unit 20, a visualization unit 22, a network modification unit 24, and an I/O unit 26, respectively. The visualization unit 22 allows to display the different source and destination nodes, in particular in the form of a geographical map, a topology map, and bar charts, respectively. Thus, the visualization unit 22 handles the information about the node objects, link objects, and information objects, respectively.

Further, the network modification unit 24 is a self-contained component that handles movement of objects, labels and marking according to objects specified by the network operator via an I/O unit 26.

Within the network load unit 18 the graphical objects are displayed and linked to information objects. This solution allows to change the implementations of both the graphical objects and the information objects without disturbing the rest of the application. As already outlined above, the visualization unit 22 has different options to represent a network, the first being the display of nodes and links on a real world map and the second being the representation of the topology of the network according to the geographical disposition. However, with the first form of representation, the network elements are not evenly distributed over the display of the network load unit 18, in particular, they will be closer to each other in large cities and not so close in rural areas. Further, links usually do not go in straight lines from point-to-point but are bent in a complicated fashion. Also, eventually a great number of nodes will be clustered into groups.

These disadvantages may be overcome by providing a zooming function in the visualization unit. Also, an improved visualization of the network would rely on topology and ignore real world and geographic disposition. Also, according to the invention it is possible to cluster groups of nodes which are then represented as one unit. Heretofore, the visualization unit 22 uses the existing hierarchical system in dynamic routing protocols such as the PNNI protocol, and thereby generates a natural clustering of nodes into larger units that may then be zoomed out. This is particularly helpful in case a geographic visualization of the nodes is required. Another option to exploit hierarchical structures would be to use the PNNI peer groups necessary to re-configure the PNNI hierarchy.

The network modification unit 24 shown in FIG. 3 is particularly provided to evaluate different system configurations, that is to calculate how the load situation would change in case there is inserted another network element or link. Thus, the network modification unit 24 together with the I/O unit 26 provides functionality to add new nodes and links into both, the virtual network and the real network.

While in the above, a first embodiment of the present invention has been described with respect to FIG. 1, in the following a second embodiment using a client server architecture will be described with respect to FIG. 2.

Figure 2:
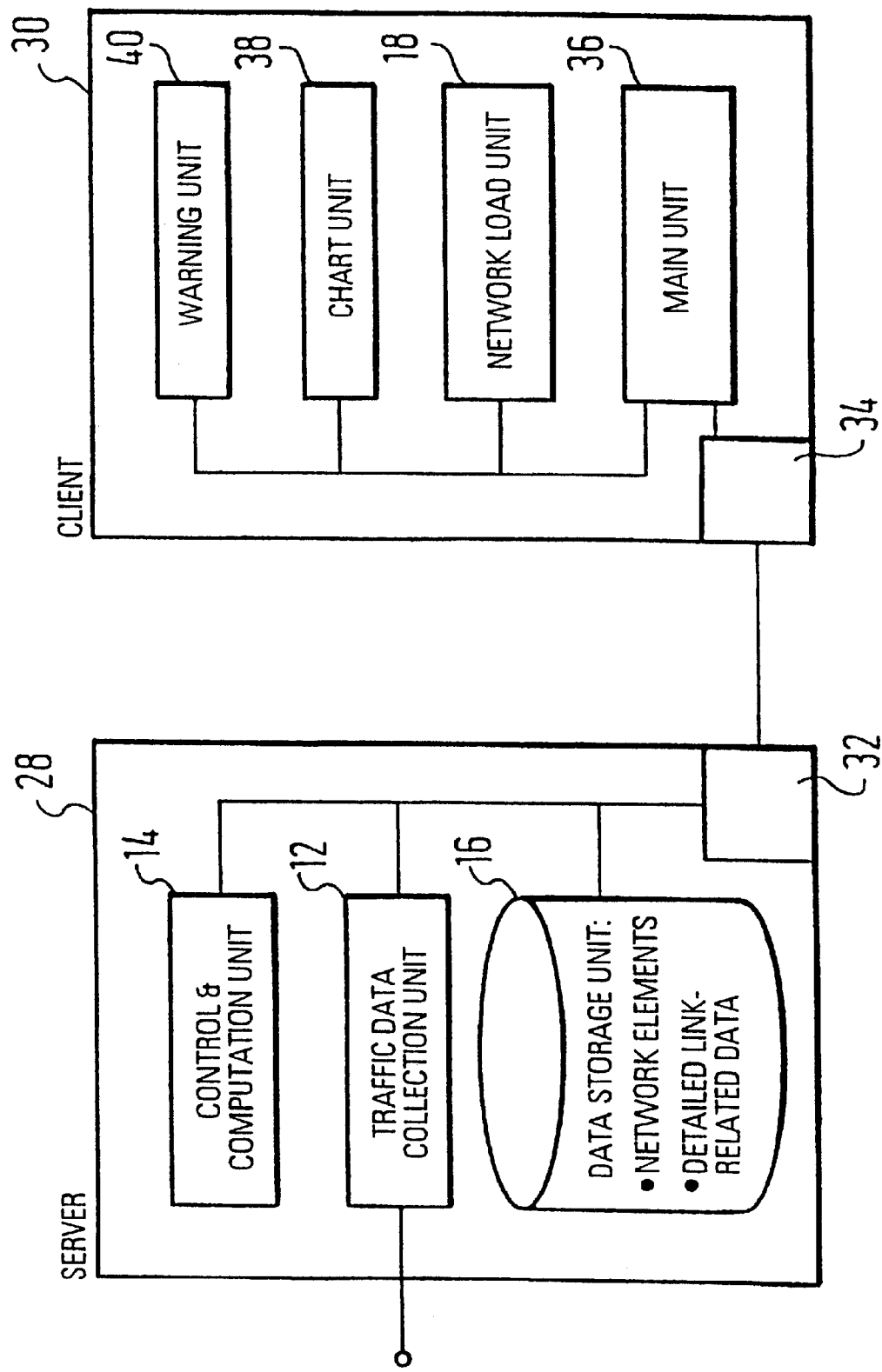
FIG. 2 shows a schematic diagram of a traffic data evaluation apparatus according to a second embodiment of the present invention that is realized with a client server structure.

As shown in FIG. 2, according to the second embodiment of the present invention, the functionality of the traffic data evaluation apparatus is split into two components, i.e. the server 28 and the client 30. As shown in FIG. 2, the server 28 comprises the control and commutation unit 14, the traffic data collection unit 12, and the data storage unit 16 already explained above with respect to the first embodiment. Thus, the server 28 handles the major computation tasks at a central position.

Further, as shown in FIG. 2, two interface units, e.g., TCP/IP sockets 32 and 34, are provided to connect the server 28 with a client 30 where the functionality according to the network load unit 18 is implemented in a decentralized fashion. Further, a main unit 36 coordinates the different components in the client 30 and also the communication transfer between the server 28 and the client 30. The structure of the network load unit 18 and the client 30 corresponds to the one previously explained with respect to FIG. 3, and therefore explanation thereof will not be repeated here.

According to the client server architecture shown in FIG. 2, a server system provides data to the client. This data is passed, e.g., through normal TCP/IP sockets and access to the server may be limited by means of normal security solutions known from, e.g., the Internet. One example to implement the server is to use the Erlang language, and the client may consist of , e.g., a JAVA Applet.

As shown in FIG. 2, the main tasks of the client 30 is to display the measured and analyzed data requested by the network operator. In case the client is written in the JAVA programming language, according to the invention it is possible to get access to all the advantages of the JAVA platform, i.e. a wide area of application for the client 30 and an implementation thereof with very low effort. Further, as shown in FIG. 2, the client 30 also comprises a charge unit 38 consisting of a chart and pull-down-menu. The menu controls the time interval for the charts which then are drawn according to pre-specified values.

Further, as shown in FIG. 2, the client 30 may comprise a warning unit 40. Usually, the network operator sees an analysis and measured values for a momentary picture of a continuous line of events. Further, most of these values will usually be within limits that must be considered normal. Thus, there is a need for a warning unit 40 that will be operated during normal operation such that the network operator may turn his attention to other things as the warning unit 40 will be activated if it detects unusual load tendencies. In other words, the warning unit 40 has to monitor measurements constantly in order to determine links with a continuous virtual high load. One object according to the present invention is to specify a threshold such that no warning is given by the warning unit 40 before reaching a specified level in number of times within a certain period.

As shown in FIG. 2 and already outlined above, the server is the part of the traffic data evaluation apparatus according to the second embodiment of the invention that provides the client 30 with data. Heretofore, the server 28 stores data collected by the traffic data collection unit 12 from network elements and call detail record CDR data bases in the data storage unit 16. This information that is needed from the network elements is allocated bandwidth per logical link where a logical link is a number of physical links between the same two nodes. While momentarily information is only available for physical links this could easily change by creating a counter in the network element that works with the logic links or by downloading all values and adding them together in the server 28. The reading frequency of the traffic data collection unit 12 should be set such that the workload in the separate network elements becomes very low and neglectable.

According to the present invention, the server 28 is based on the Erlang-platform. This is not necessarily the only platform for fast database and calculation operations, however, it allows for a very fast development time for systems in Erlang.

As outlined above with respect to the first embodiment, the traffic data collection unit 12 according to the first and second embodiment collects data with respect to the actual traffic in the network using a dynamic routing protocol. Another option shown in FIG. 4 and particularly suited for the evaluation for a great number of network prototypes is the use of a network simulator. While in the following an example of a network simulator is described that provides all information necessary for the load evaluation, all enhanced versions of such a network simulator similarly may be used according to the invention.

Figure 4:
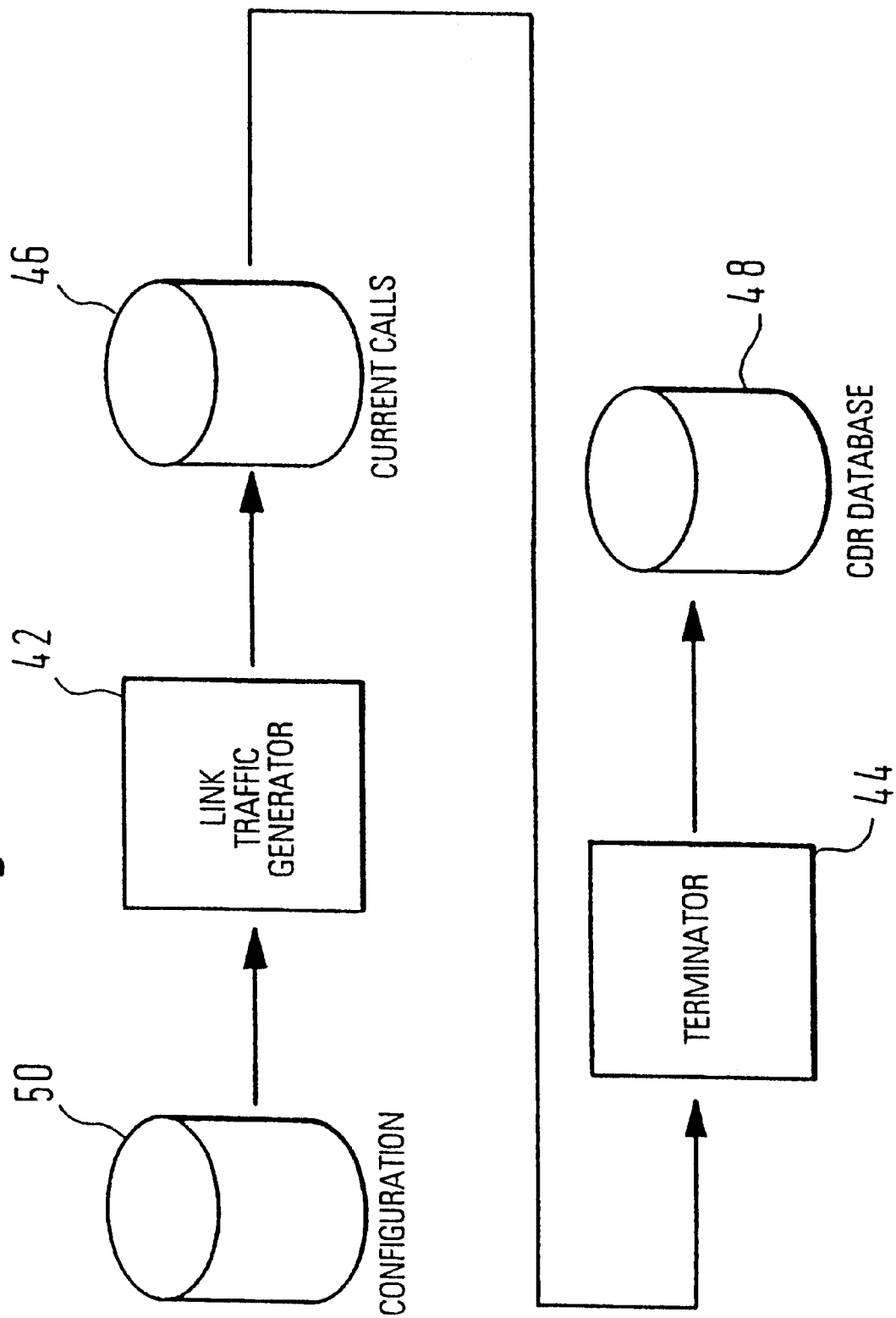
FIG. 4 shows a schematic diagram of a network load simulator according to the present invention to be used for the generation of real traffic data.

As shown in FIG. 4, the network simulator works with two units, the generating unit 42 and the terminating unit 44. The generating unit selects at random a source and destination node, then computes the best routes through the simulated network. Then, the generating unit tries to establish a connection along one of the best routes or, in other words, it tries to allocate bandwidth for this connection. In case it succeeds, the link is registered in a current link data base 46.

In the network simulator the routing is done dynamically and based on the allocated bandwidth on the links in the simulated network. Every link and route is given a rated value interaction proportion to the load and the length specified by the number of nodes in this route. Here it is of particular importance that the network simulator uses some kind of dynamic routing protocol.

Further, the terminating unit 44 shown in FIG. 4 traverses the current call data base 46 storing active cells. Every call has a randomly chosen length and when its time has passed, the call is removed from the current call data base 46 and a call detailed record is stored in the CDR database 48 of the network simulator. Here, the CDR database 46 does not store all the information a real CDR database would do, but only the information that is important for the purpose of network load evaluation.

Thus, according to the invention there is provided a network simulator that simulates calls, routing and establishment procedures rather than bit or cell transport procedures. Also, the network simulator works on its own predefined network read from a configuration unit 50 without any restrictions on the number of nodes, number of links, or load capacities allocated to each link.

Figure 6:
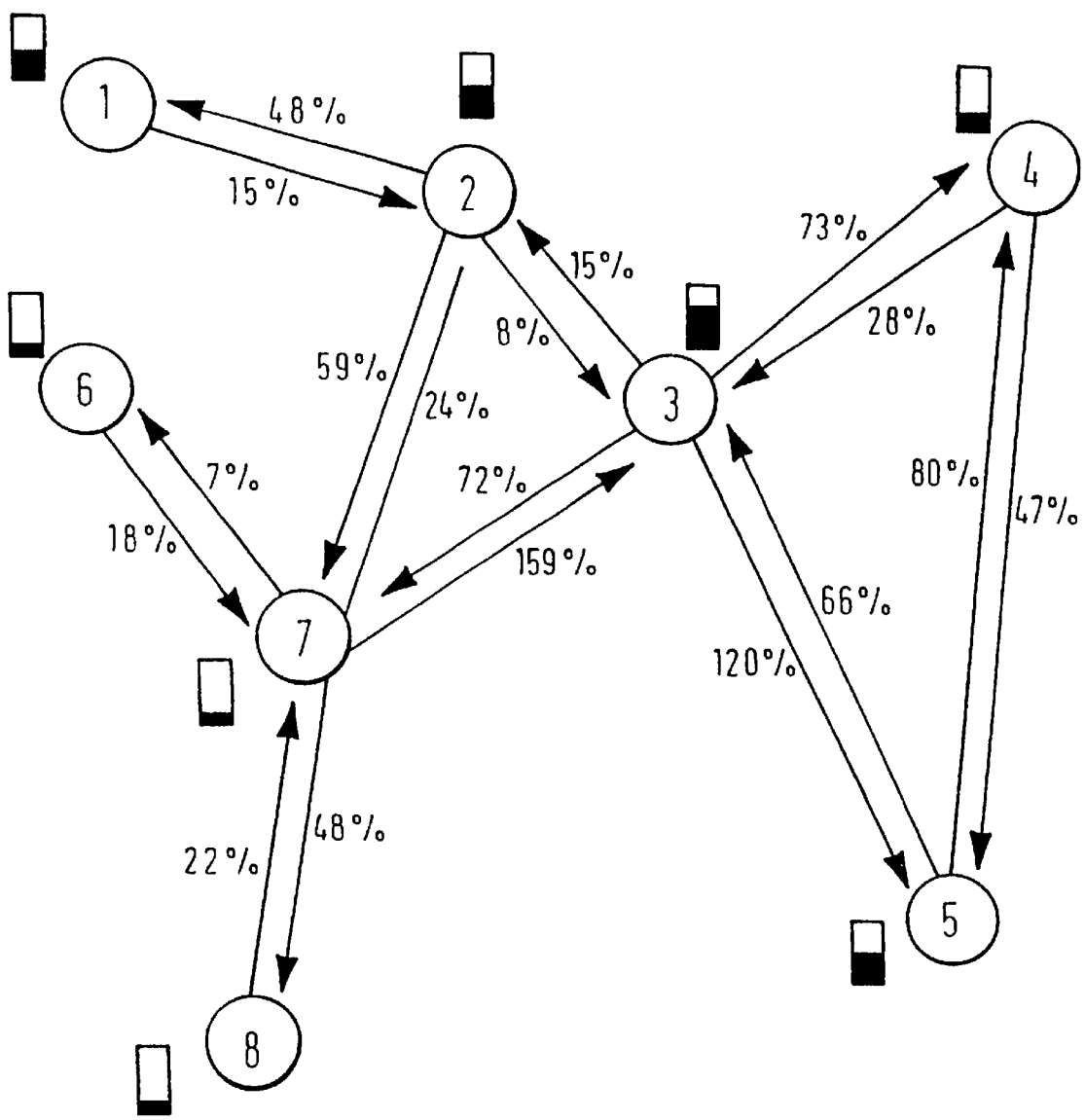
FIG. 6 shows a result of the traffic data evaluation approach according to the present invention with respect to each virtual link in the virtual network and each direction, respectively, where also the impact of non-serviced requests for connection is considered.

While in the above a typical result of the network load evaluation according to the present invention has been discussed with respect to FIG. 5, another option of the network load evaluation approach according to the invention is shown in FIG. 6.

In particular, according to the modified approach for traffic data evaluation in a network using dynamic routing, the attempts that did not result in the establishment of a connection are also taken into account. Usually, there are a number of reasons for a connection not to be established. One example would be that the number of attempts is so large that the network cannot handle all of them or that there only exists insufficient bandwidths to establish another connection.

While there is no dedicated way to tell how long a rejected connection would have been established and it must be assumed that some of the established connections have a history of the rejected attempts, according to the present invention it is proposed to use a statistical analysis of variables like length, bandwidth and number of attempts needed to establish a call. Using this approach, one may estimate how attempts would have influenced the load picture in case they would have been accepted. Thus, according to this modified approach of the invention one achieves a clearer picture of the need of bandwidth, as shown in FIG. 6 with respect to bars indicating rejected calls.

Overall, while the traffic data evaluation according to the present invention preliminarily aims at easing the pressure on already existing links that shows signs of being potentially overloaded, the fact that a link is overloaded does not necessarily mean that there exists a need for more bandwidth on that particular link. Here, according to the present invention, there is provided a way to determine where the extension of an existing network is most reasonably built therein.

While in the above, the operation of the control and computation unit 14 has been mainly described with respect to call detail records CDR, respectively, another third option would be to determine whether calls according to the best route analysis would pass a certain link. Then, the frequency of source-destination node pairs is determined according to either the number of calls or rated for bandwidth demands. In case that one or many pairs of nodes are high frequent, one may consider the direct insertion of a link between these nodes to reduce a sort of quality reduction. If, on the other hand no particular path node is distinguished that way, one might consider increasing the capacity of the overloaded links.

Overall, the traffic data evaluation approach according to the present invention allows to draw improved conclusions in terms of needed extensions and changes in a network using dynamic routing protocols. In particular, the invention provides for improved handling of varying needs where services pop up, new subscribers are added, or subscribers moved, a new transmission technology is mixed with old infra-structure. Here, the point is to avoid to build an under dimensioned network that cannot serve all the customers which will then leave for other operators. Further, a network operator will also try to avoid to build an over dimensioned network and the heavy investment costs related thereto which would eventually lead to increased customer bills and thus again to the loss of customers. With the traffic data evaluation approach according to the present invention, the efficiency of a network using a dynamic routing protocol may be increased by measuring loads on nodes in links regularly. Thus, one may get an opinion about such phenomena like busy hours, service mix, and so on. By storing and analyzing these data it is possible to predict the bandwidth needs in the nearest future that may effect the route selection in the network.

A number of different signs serves to indicate a mis-dimensioning of the network using a dynamic routing model. The check for over capacity in the network is very simple. In particular, in case there is over capacity, the figures for seized bandwidth will on average be low apart from certain hours of the day, when the need for communication is temporarily higher. This phenomenon described as "busy hours" above is already known from telephony. To the contrary, under capacity displays itself in the opposite way, namely in constant high load values in the entire network, i.e. the net is then extremely overloaded. In this case, the load situation is seen in the same way as outlined above with respect to the different embodiments of the present invention. Another symptom that will display is the increasing number of rejected connections. However, according to the present invention this will be noticed since the call/link detail records are recorded even if the attempt to establish the connection fails.

Nevertheless, the case where the entire network gets overloaded will be very rare. More likely is the case that some separate links are overloaded. While the network with dynamic routing will then compensate this by routing new traffic on other parts of the network, this could eventually lead to other links being overloaded because of traffic that should have not been routed there in the first place. This is a typical case where the insertion of specific links may lead to an overall increased efficiency of the network using a dynamic routing protocol.

FIG. 7 shows examples for the extensions of an existing net through the insertion of further links therein. Examples are the extensions from partial net to full mesh, FIG. 7a, single bus to a multiple bus, FIG. 7b, partial ring to full ring, FIG. 7c, star to starring topology, FIG. 7d, and tree to planar graph topology, FIG. 7e, respectively.

Figure 8:
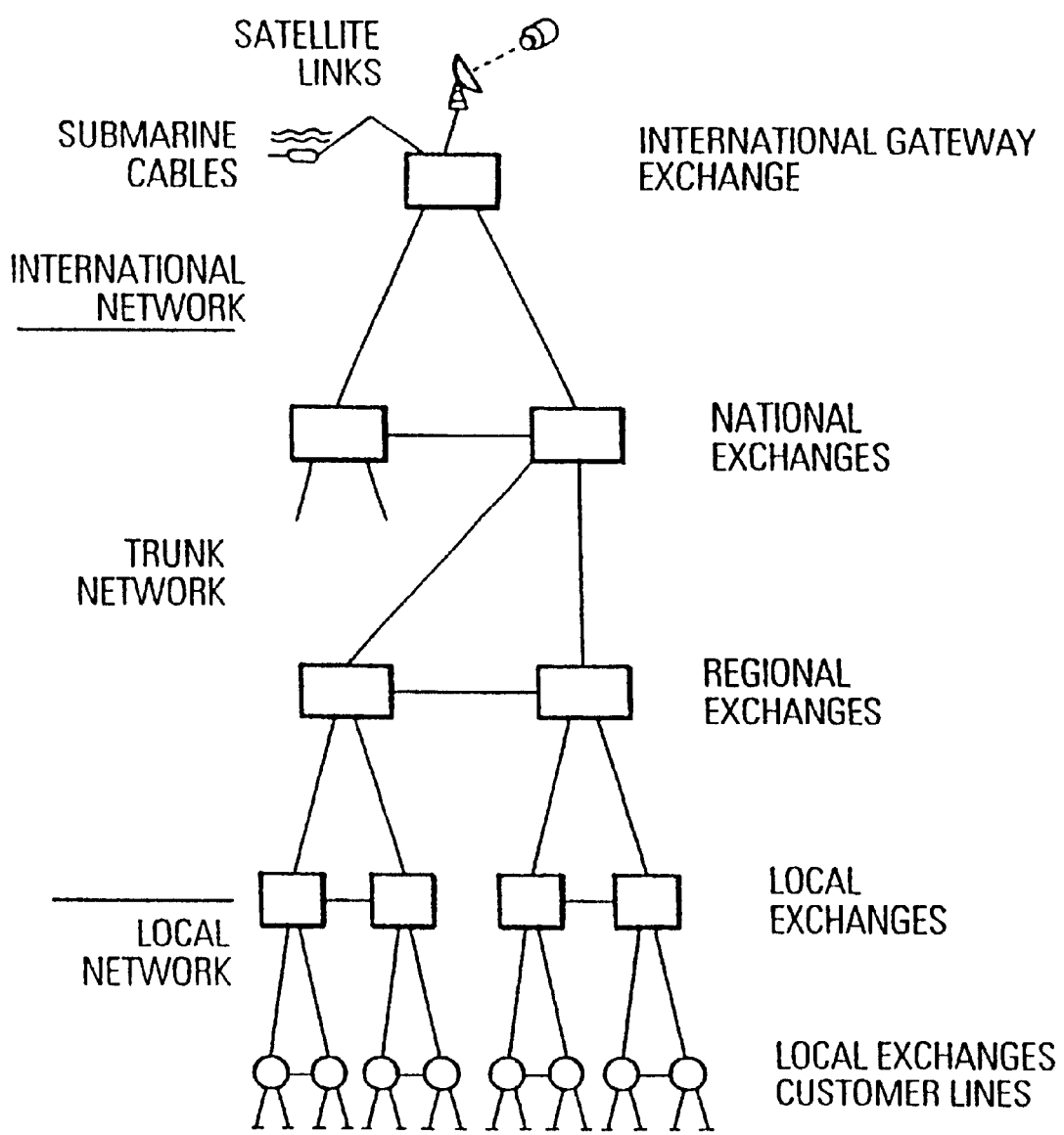
FIG. 8 shows the application of the traffic data evaluation approach to a hierarchical network.
Figure 9:
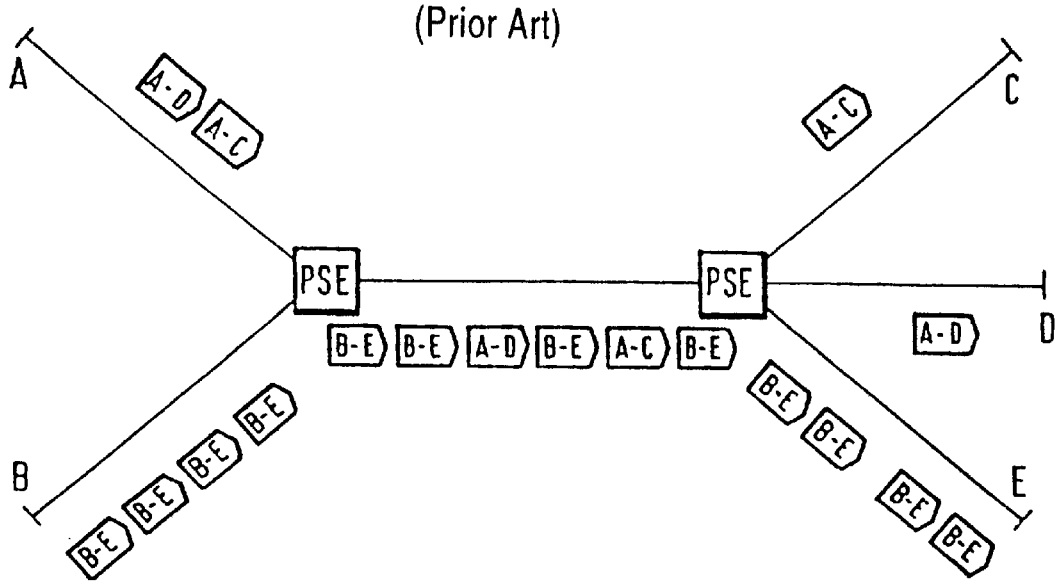
FIG. 9 shows the principle underlying networks using circuit switching and further the principle time sharing multiplexing.
Figure 10:
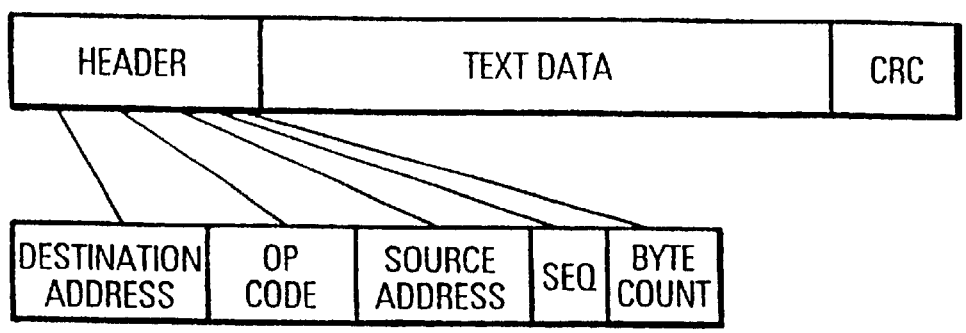
FIG. 10 shows a typical packet format.
Figure 11:
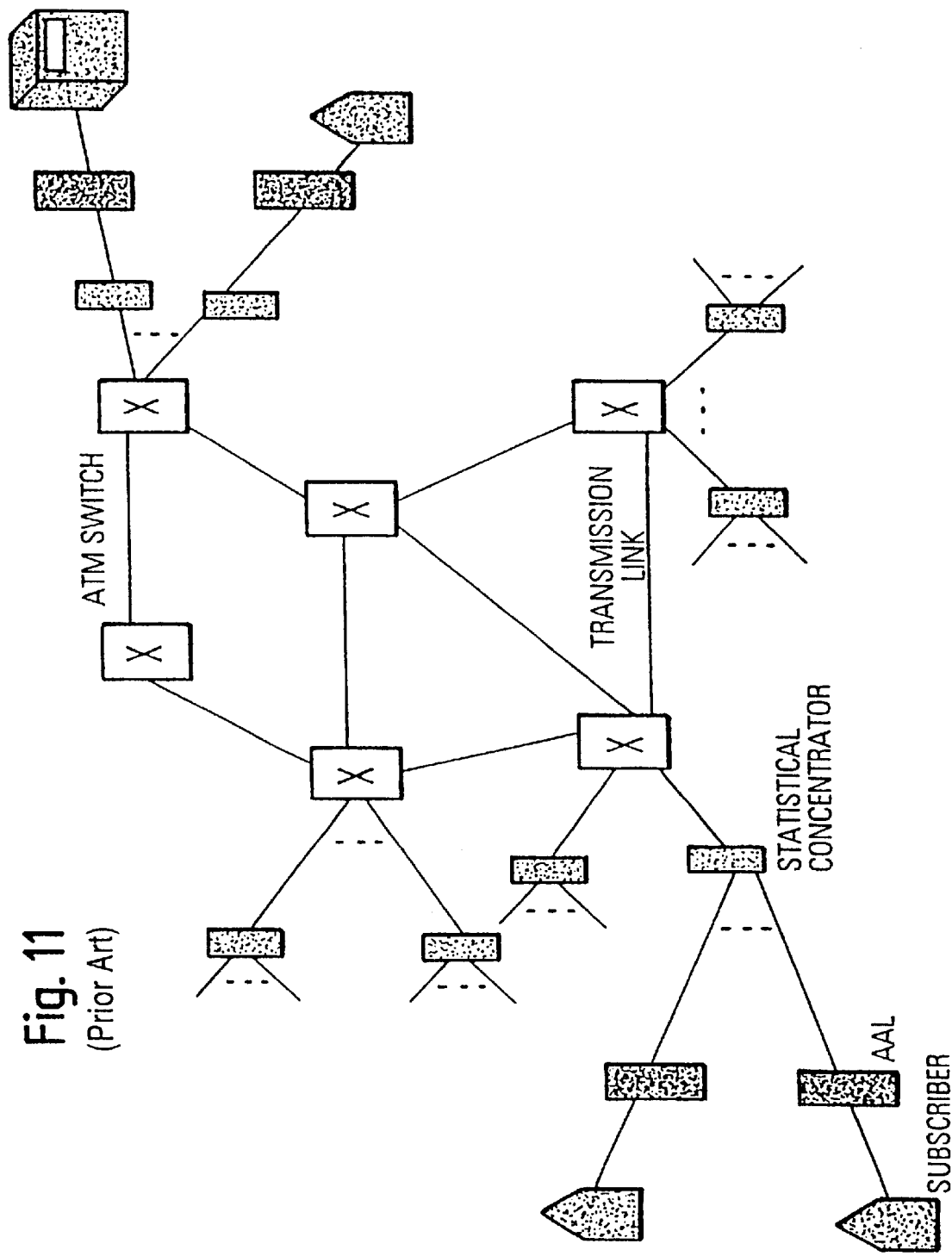
FIG. 11 shows elements of an ATM network as example for a network using dynamic routing.
Figure 12:
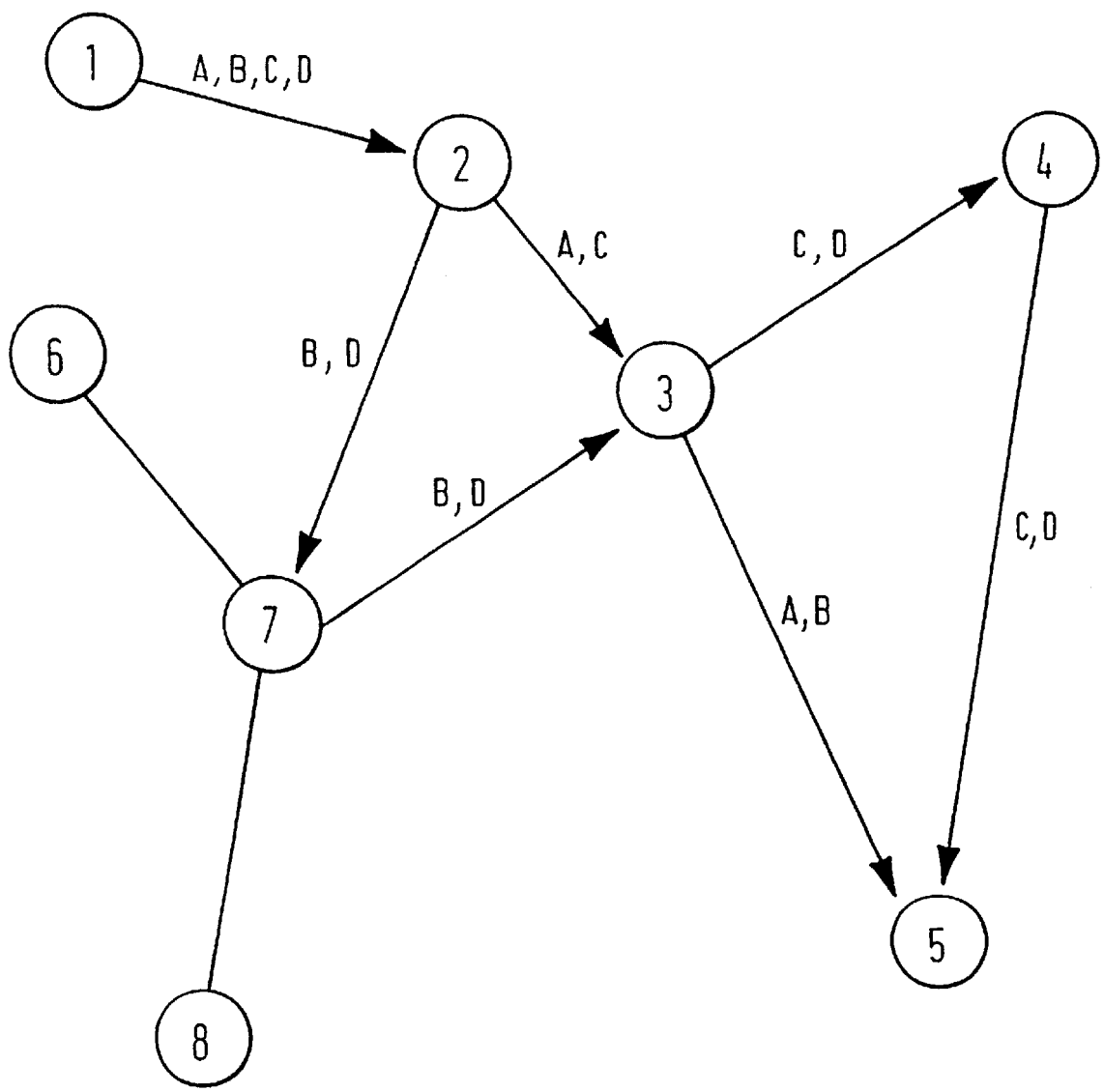
FIG. 12 shows a typical example for multiple routes through a network using dynamic routing.
Figure 13:
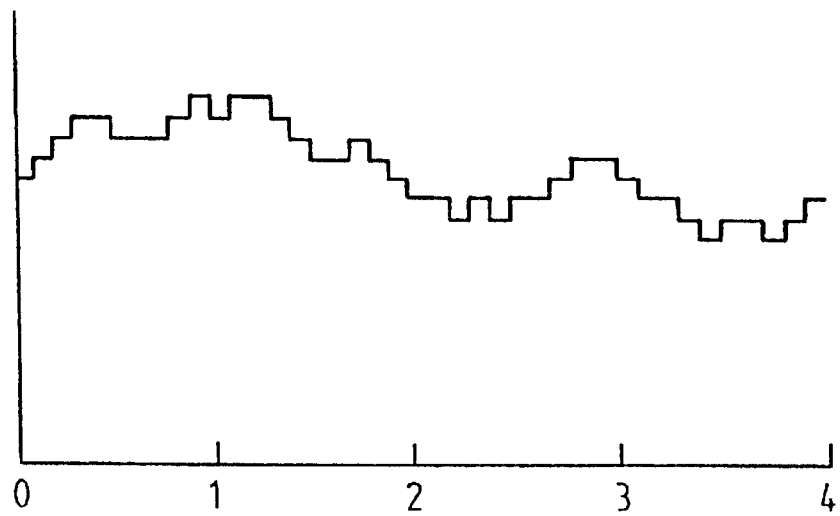
FIG. 13 shows a short term traffic variation on a link.
Figure 14:
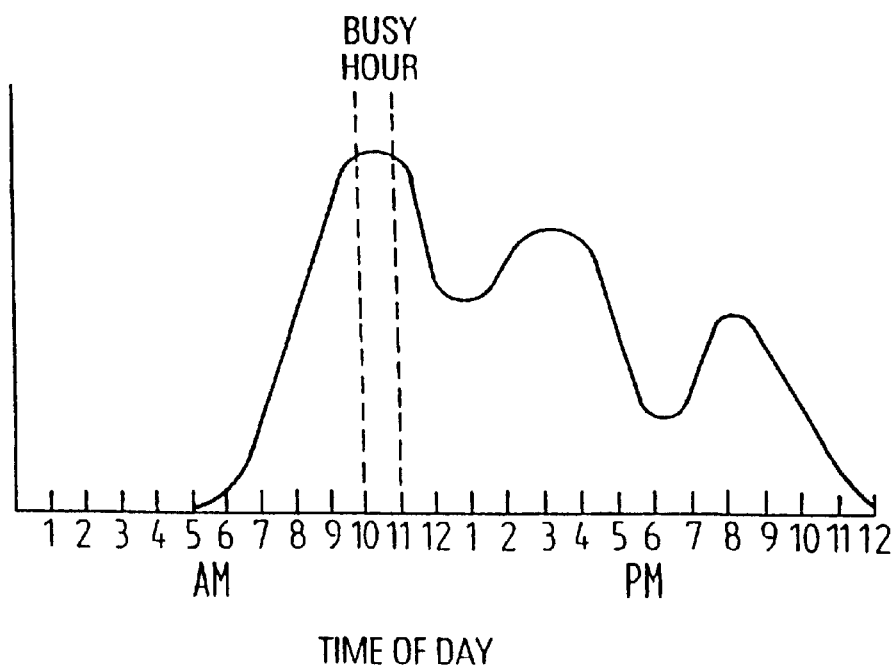
FIG. 14 shows a long term traffic variation on a link.

Further, as shown in FIG. 8, the traffic data evaluation approach according to the present invention may be used on different levels of abstractions in a hierarchical network. Such level could be the level of local exchanges, the level of regional exchanges and the level of national exchanges or switches, respectively. Further, the present invention is also well suited for links being related to the international exchange of data, e.g., via satellite links or submarine cables.

What is claimed is:

1. Traffic data evaluation apparatus for evaluating traffic in a real network using dynamic routing where traffic routes are determined before transfer of data, comprising:
    a) traffic data collection means to collect data with respect to a real traffic flow in the real network,
    b) network modeling means to model the network through a virtual network having virtual links without capacity restrictions imposed thereon, wherein said virtual network models the real network but said virtual links do not exist in the real network;
    c) network load evaluation means including mapping means to map the real traffic flow of the real network onto the virtual network assuming optimal dynamic routing, and comparison means to compare capacity used for each virtual link with the capacity assigned thereto; and
    d) network modification means for changing dynamic routing, where traffic routes are determined before transfer of data, by modifying the real and/or virtual network by adding new links and/or nodes thereto based at least in part upon comparisons performed by said comparison means.

2. Traffic data evaluation apparatus according to claim 1, wherein the network load evaluation means (18) maps the real traffic flow onto the virtual network through post-processing of data collected by the traffic data collection means (12).

3. Traffic data evaluation apparatus according to claim 1, characterized in that the traffic data collection means (12) collects the data with respect to the real traffic flow through measurement.

4. Traffic data evaluation apparatus according to claim 1, wherein the traffic data collection means collects simulated data with respect to the traffic flow from a simulation device.

5. Traffic data evaluation apparatus according to claim 4, characterized in that the simulation device (42–50) comprises:
 a) traffic generation means (42) to randomly select a source node and a destination node for a call in the network,
 b) route computation means (42) to determine at least one best route through the network,
 c) call database means (46) to store the selected best route according to the source node and destination node,
 d) call terminating means (44) to remove established calls from the call database means (46) and to share details with respect to the removed call in a call recording database (46).

6. Traffic data evaluation apparatus according to claim 5, characterized in that the route computation means (42) calculates the at least one best route using pre-defined algorithms.

7. Traffic data evaluation apparatus according to claim 1, characterized in that the traffic data collection means (12) is operated continuously.

8. Traffic data evaluation apparatus according to claim 1, characterized in that the network load evaluation means (18) further comprises:
 a) visualization means (22) to represent the network load at a display means (20),
 b) input/output means (26) to specify insertions/ exclusions of nodes/links into the virtual network.

9. Traffic data evaluation apparatus according to claim 1, wherein it is implemented according to a client/server structure.

10. Traffic data evaluation method for evaluating traffic in a real network using dynamic routing where traffic routes are determined before transfer of data, the method comprising:
 a) modeling the real network through a virtual network having no capacity restrictions imposed on the virtual links thereof, wherein the virtual links do not exist in the real network,
 b) collecting traffic data from the real network with respect to real traffic mapping,
 c) mapping real traffic data of the real network on the virtual network assuming optimum dynamic routing where traffic routes are determined before transfer of data,
 d) comparing used capacity with assigned capacity for each virtual link, and
 e) modifying the real network by adding at least one of a new link and a new node thereto based at least in part upon said comparing of the used capacity with assigned capacity for each virtual link.

11. Traffic data evaluation method according to claim 10, characterized in that step b) is sub-divided into steps
 b1) collection of data on actual traffic in the network, and
 b2) post-processing of data collected in step b1) to achieve a load picture on the virtual network.

12. Traffic data evaluation method according to claim 11, wherein the collection of data according to step b1) is achieved through measuring connection time, bandwidth, originating node, and terminating node for all connections established via dynamic routing.

13. Traffic data evaluation method according to claim 11, characterized in that the collection of data according to step b1) is achieved through simulation of connection time, bandwidth, originating node, and terminating node for all connections established via dynamic routing.

14. Traffic data evaluation method according to claim 13, characterized in that the simulation step sub-divides into the following steps:
 a) randomly selecting a source node and a destination node for a call in the network,
 b) computation of at least one best route through the network,
 c) establishing a call along the at least one best route,
 d) inserting the call in a current call database,
 e) traversing the current call database to remove established calls therefrom, and
 f) storing details with respect to the removed call in a call recording database.

15. Traffic data evaluation method according to claim 14, characterized in that step b) to compute the at least one best route through the-network is based on pre-defined algorithms.

16. Traffic data evaluation method according to claim 11, characterized in that within the step b1) to collect data on actual or real traffic also comprises the consideration of the impact of not-established connections on the load situation of the network through statistical analysis of the variables connection length, connection bandwidth and number of attempts, respectively.

17. Traffic data evaluation method according to claim 10, characterized in that the step to collect data on real traffic is executed continuously to monitor fluctuations of the network load.

18. Traffic data evaluation method according to claim 10, characterized in that the step to collect data on real traffic is carried out selectively with respect to individual classes/ types of traffic.

19. Traffic data evaluation method according to claim 10, characterized in that the load information derived through the comparison of used capacity and assigned capacity for each link is used to draw conclusions in terms of needed extensions and changes of the network, respectively.

20. Traffic data evaluation method according to claim 19, characterized in that the step to draw conclusions in terms of needed extensions and changes of the network comprises a statistical analysis of source/destination node pairs to decide on the insertion of further nodes and links into the network.

21. Traffic data evaluation method according to claim 10, characterized in that it further comprises a step to visualize the network load for a network operator with respect to each link and direction, respectively.

22. Traffic data evaluation method according to claim 21, characterized in that the step to visualize the network load uses a geographical map, a topology map and bar charts, respectively.

23. Traffic data evaluation method according to claim 10, characterized in that it also comprises a warning step being activated after a long time virtual overload situation in the network.

24. Traffic data evaluation method according to claim 10, characterized in that if further comprises the step of insertion and exclusion of nodes and links into the virtual network, respectively.

* * * * *